(12) United States Patent
Kanamaru et al.

(10) Patent No.: US 7,750,238 B2
(45) Date of Patent: Jul. 6, 2010

(54) ELECTRICAL JUNCTION BOX

(75) Inventors: Masahiro Kanamaru, Shizuoka-ken (JP); Makoto Nakayama, Shizuoka-ken (JP); Tarou Inoue, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 382 days.

(21) Appl. No.: 11/959,833

(22) Filed: Dec. 19, 2007

(65) Prior Publication Data

US 2009/0115296 A1 May 7, 2009

(30) Foreign Application Priority Data

Dec. 21, 2006 (JP) .......................... P2006-344220

(51) Int. Cl.
*H02G 3/08* (2006.01)
(52) U.S. Cl. ..................... 174/50; 174/58; 174/559; 174/66; 174/67; 439/535; 248/906; 361/601; 361/600

(58) Field of Classification Search .................. 174/50, 174/58, 500, 503, 559, 560, 561, 135, 66, 174/67; 220/3.2, 3.3, 4.02; 361/601, 683, 361/752, 600; 439/535; 248/906; 312/223.2, 312/223.3
See application file for complete search history.

(56) References Cited

U.S. PATENT DOCUMENTS

| 6,005,768 | A | * | 12/1999 | Jo ......................... 361/679.34 |
| 6,909,047 | B2 | * | 6/2005 | Zhang .......................... 174/50 |
| 7,443,672 | B2 | * | 10/2008 | Peng et al. .................. 361/695 |
| 7,544,887 | B2 | * | 6/2009 | Iizuka .......................... 174/50 |
| 7,635,811 | B2 | * | 12/2009 | Chen et al. .................... 174/50 |

FOREIGN PATENT DOCUMENTS

JP 7-42538 8/1995

* cited by examiner

*Primary Examiner*—Dhiru R Patel
(74) *Attorney, Agent, or Firm*—Finnegan, Henderson, Farabow, Garrett & Dunner, L.L.P.

(57) ABSTRACT

An electrical junction box includes a box body provided with a first groove; an attachment bracket provided with a second groove; and a lower cover provided attached to the bottom surface of the box body. When the attachment bracket is properly mounted on the box body, the first and second grooves are arranged to form a single continuous third groove. A protrusion is provided on the lower cover and fits to the third groove.

2 Claims, 6 Drawing Sheets

ELECTRICAL JUNCTION BOX

BACKGROUND OF THE INVENTION

1. Field of the Invention

The present invention relates to an electrical junction box for an automobile.

2. Description of the Related Art

As shown in Japanese Utility Model Laid-open Publication No. 7-42538, in a conventional electrical junction box, an attachment bracket is integrally formed on a box body. To fix the electrical junction box to a vehicle body, the attachment bracket is fixed to the vehicle body using a bolt. A lower cover is attached to the box body and locked so as to cover the bottom surface of the box body without interfering with the attachment bracket.

In the case where the attachment bracket is integrally provided for the box body, it is impossible to apply only one type of electrical junction boxes to all vehicles having various attachment forms depending on vehicle type or the like. In such a case, it is necessary to prepare several types of electrical junction boxes whose attachment brackets have different sizes for the individual attachment forms, thus resulting in low productivity.

SUMMARY OF THE INVENTION

In the light of the aforementioned circumstances, an object of the present invention is to provide an electrical junction box which can be flexibly applied to different forms of attachment of the electrical junction box and includes an attachment bracket having strength of fixing the electrical junction box increased.

An aspect of the present invention is an electrical junction box, including: a box body which accommodates an electrical part or the like and is provided with a first groove; an attachment bracket which is dismountably mounted to a bottom surface of the box body and provided with a second groove; and a lower cover which is attached to the bottom surface of the box body and provided with a protrusion. When the attachment bracket is properly mounted on the box body, the first and second grooves are arranged to form a single continuous third groove, and the protrusion fits to the third groove.

According to the aforementioned constitution, the attachment bracket is dismountable to the box body, and the attachment bracket can be mounted and dismounted as needed. Moreover, it is possible to select and mount a necessary type of the attachment bracket.

Accordingly, even in the case where there are various attachment forms depending on vehicle types or the like, it is not necessary to prepare different types of electrical junction boxes for the individual various attachment forms. The box body as a main part of the electrical junction box is shared as a common part, and it is only necessary to prepare different types of the attachment bracket corresponding to the individual attachment forms. The production efficiency can be therefore increased.

Furthermore, in the electrical junction box according to the present invention, the attachment bracket may be mounted on the box body through a sliding lock mechanism, and the first and second grooves may extend in a direction intersecting a direction that the sliding lock mechanism slides.

According to the aforementioned constitution, the attachment bracket is mounted on the box body through the sliding lock mechanisms.

Therefore, if the attachment bracket is improperly mounted, the first and second grooves are discontinuous with a step interposed therebetween. This prevents the lower cover from being properly attached to the box body, and the improper assembly of the attachment bracket can be recognized more clearly.

DETAILED DESCRIPTION OF THE EMBODIMENT

Figure 1:
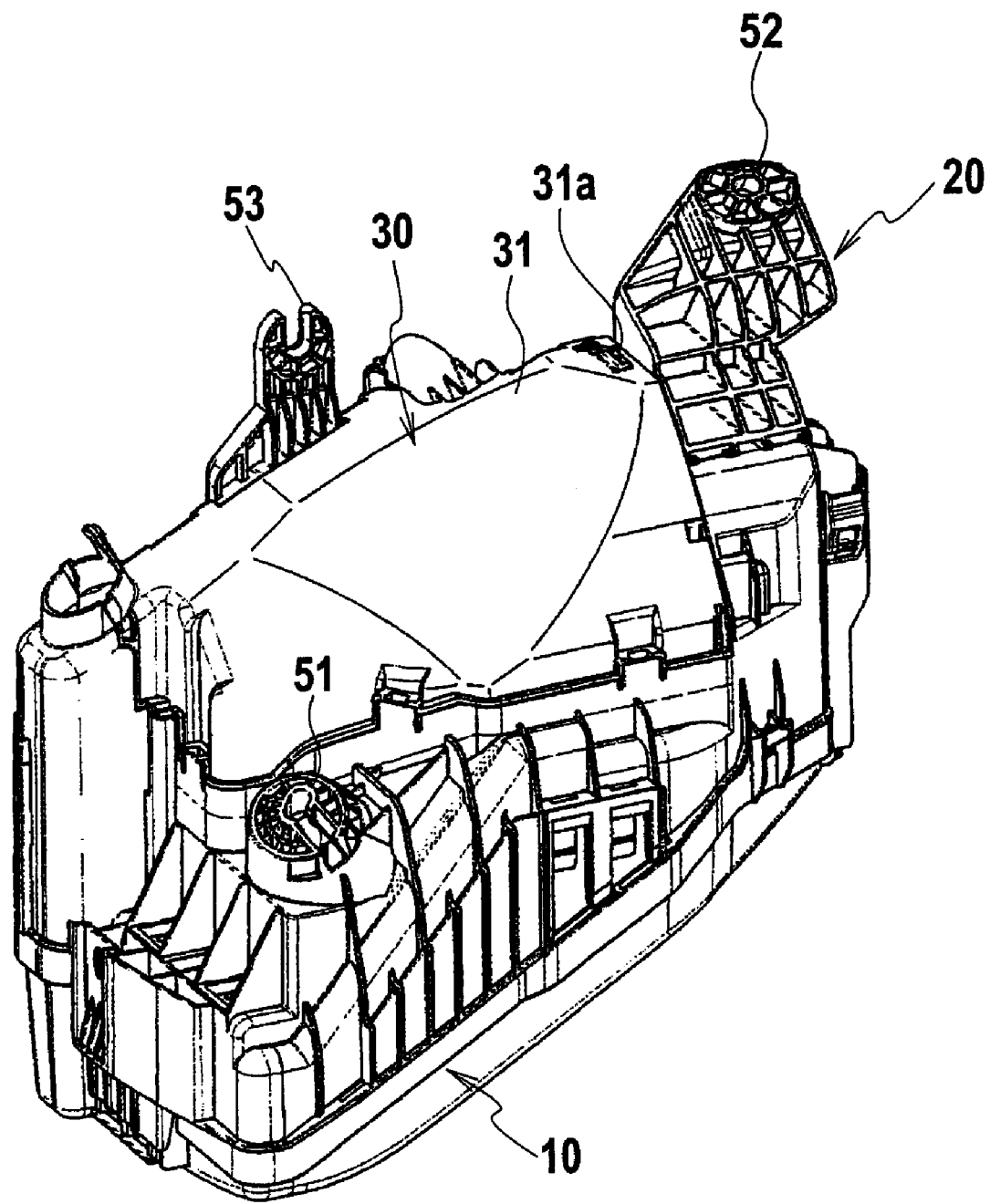
FIG. 1 is a perspective view of an electrical junction box according to an embodiment of the present invention, showing the electrical junction box turned bottom up.

A description is given of an embodiment of the present invention below with reference to the drawings.

As shown in FIGS. 1 to 5, an electrical junction box includes a box body 10 accommodating electrical parts and the like, an attachment bracket 20 for fixing the electrical junction box, and a lower cover 30. The attachment bracket 20 is dismountably mounted on a predetermined bracket seat 12 of a bottom wall 11 of the box body 10. The lower cover 30 is attached to the bottom of the junction box. The attachment bracket 20 includes a bolt fastening portion 52.

Figure 2:
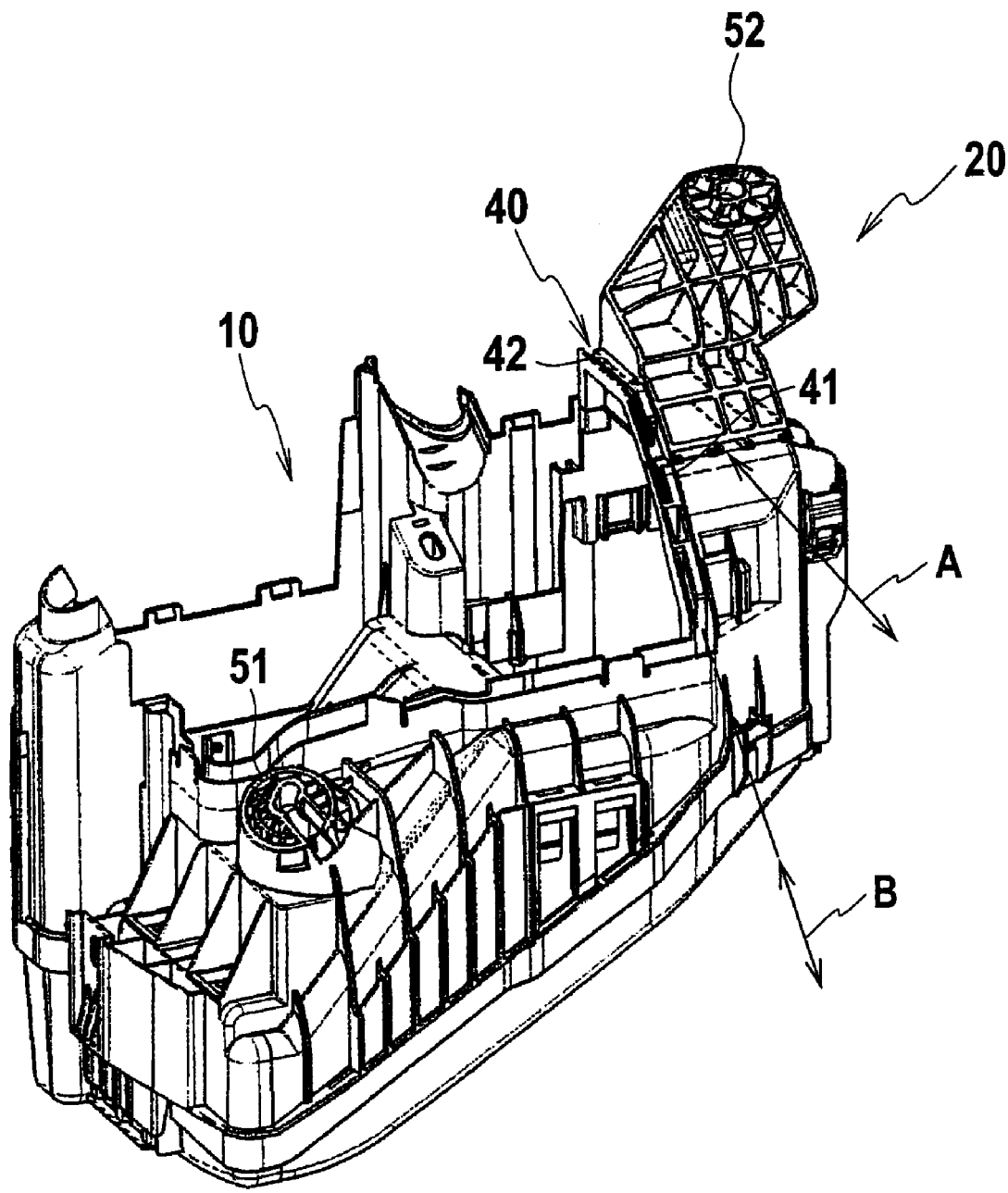
FIG. 2 is a perspective view showing the electrical junction box of FIG. 1 with a lower cover removed.

The lower cover 30 covers the bottom surface of the box body 10 other than the attachment bracket 20, and only an edge 31a of a cover body 31 overlaps the attachment bracket 20. As shown in FIG. 2, a groove 41 (a first groove) and a groove 42 (a second groove) are respectively formed in the box body 10 and attachment bracket 20 so as to correspond to the edge 31a. When the attachment bracket 20 is properly mounted, the grooves 41 and 42 form a single groove 40 (a third groove) substantially continuous. On the other hand, when the attachment bracket 20 is improperly mounted, the grooves 41 and 42 are discontinuous.

Figure 3:
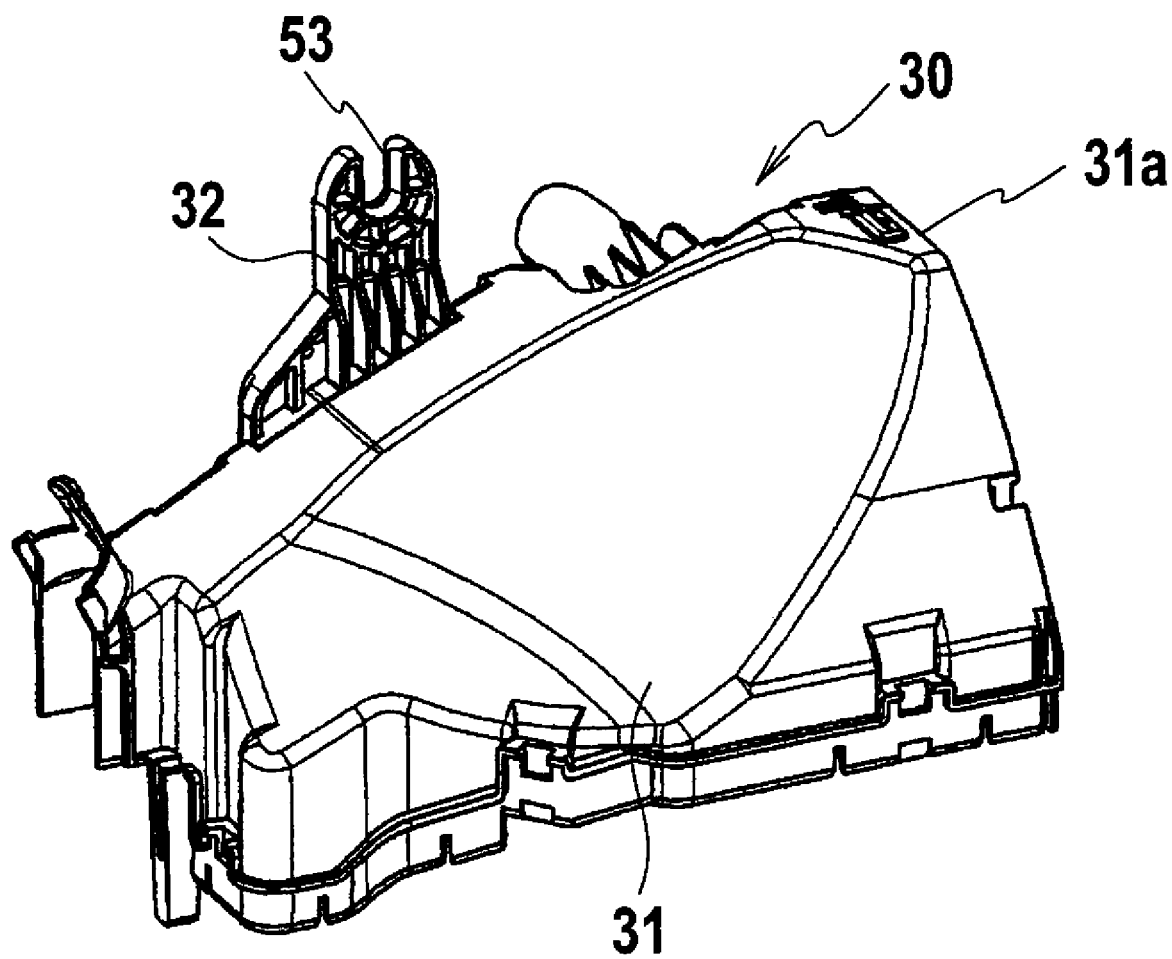
FIG. 3 is a perspective view showing the removed lower cover.
Figure 4:
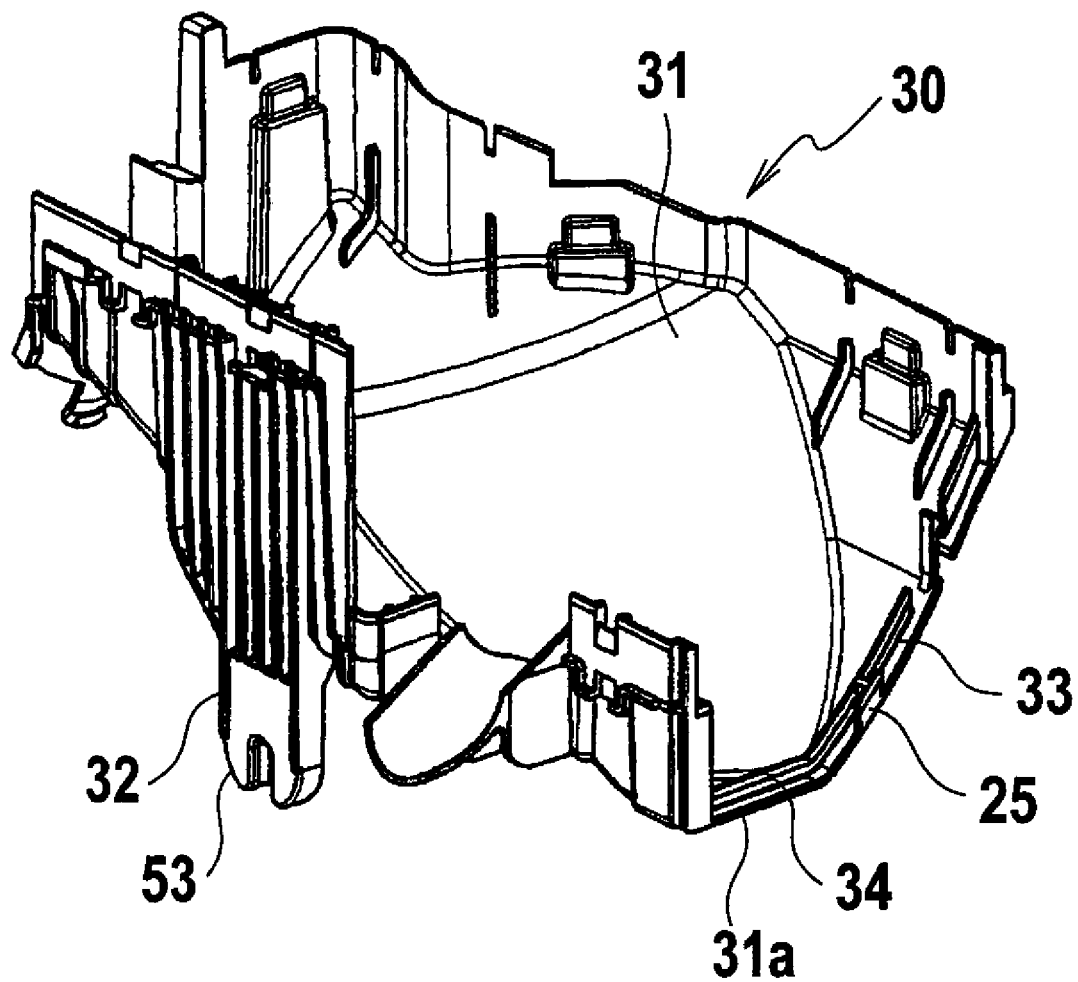
FIG. 4 is a perspective view showing a structure of an upper side (an inner side) of the lower cover.
Figure 6:
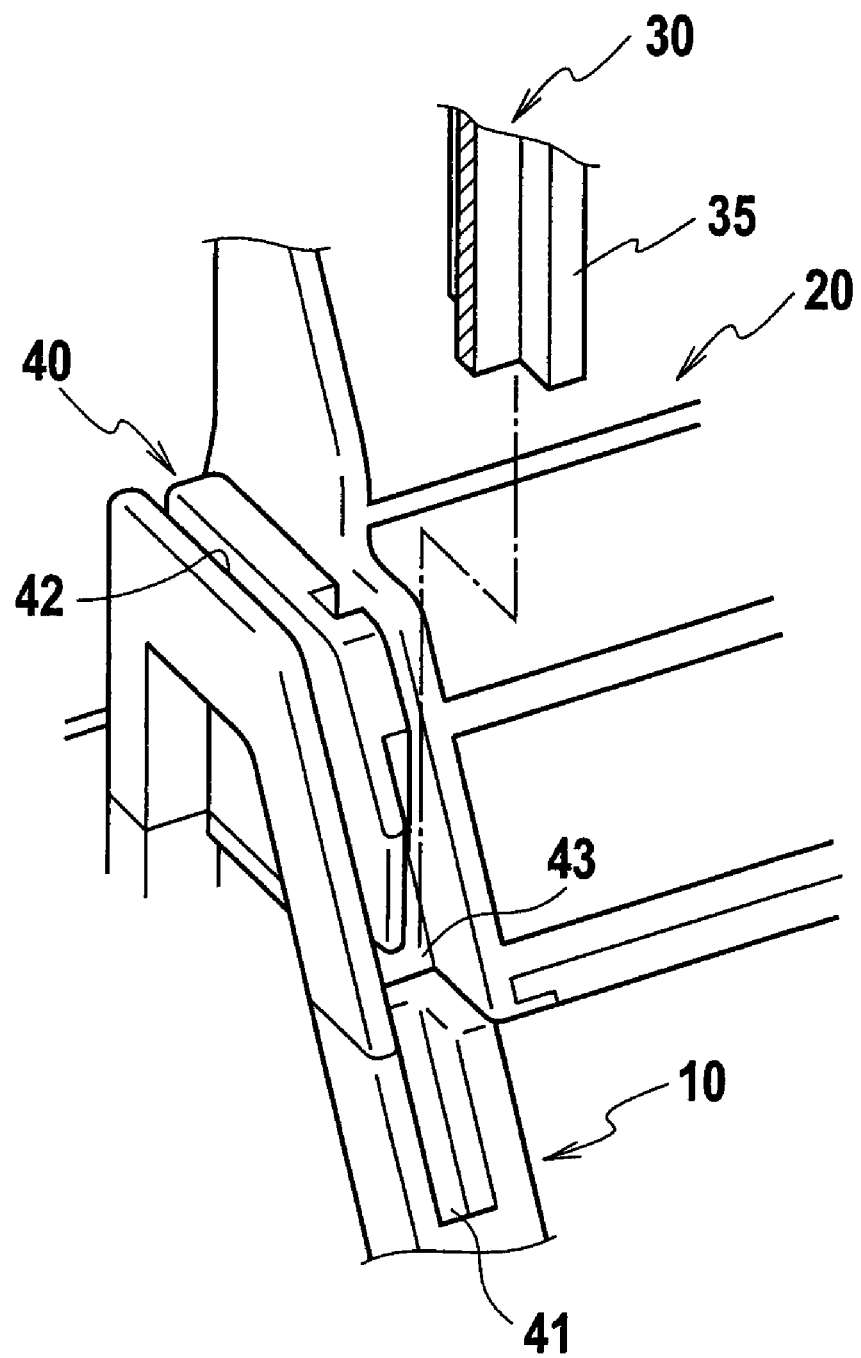
FIG. 6 is a perspective view of a main portion, showing a state where an attachment bracket is mounted on a box body to form a continuous groove and a T-shaped portion provided for a protrusion of the lower cover is being fitted to the groove.

As shown in FIGS. 3 and 4, the edge 31a of the lower cover 30 is provided with ribs (protrusions) 33 and 34. When the grooves 41 and 42 of the box body 10 and attachment bracket 20 form the single continuous groove 40, the ribs (protrusions) 33 and 34 fit to the continuous groove 40. In the middle of the ribs 33 and 34, a T-shaped portion 35 is provided. This T-shaped portion 35 fits to a key groove 43 provided in the middle of the groove 40 shown in FIG. 6.

Figure 5:
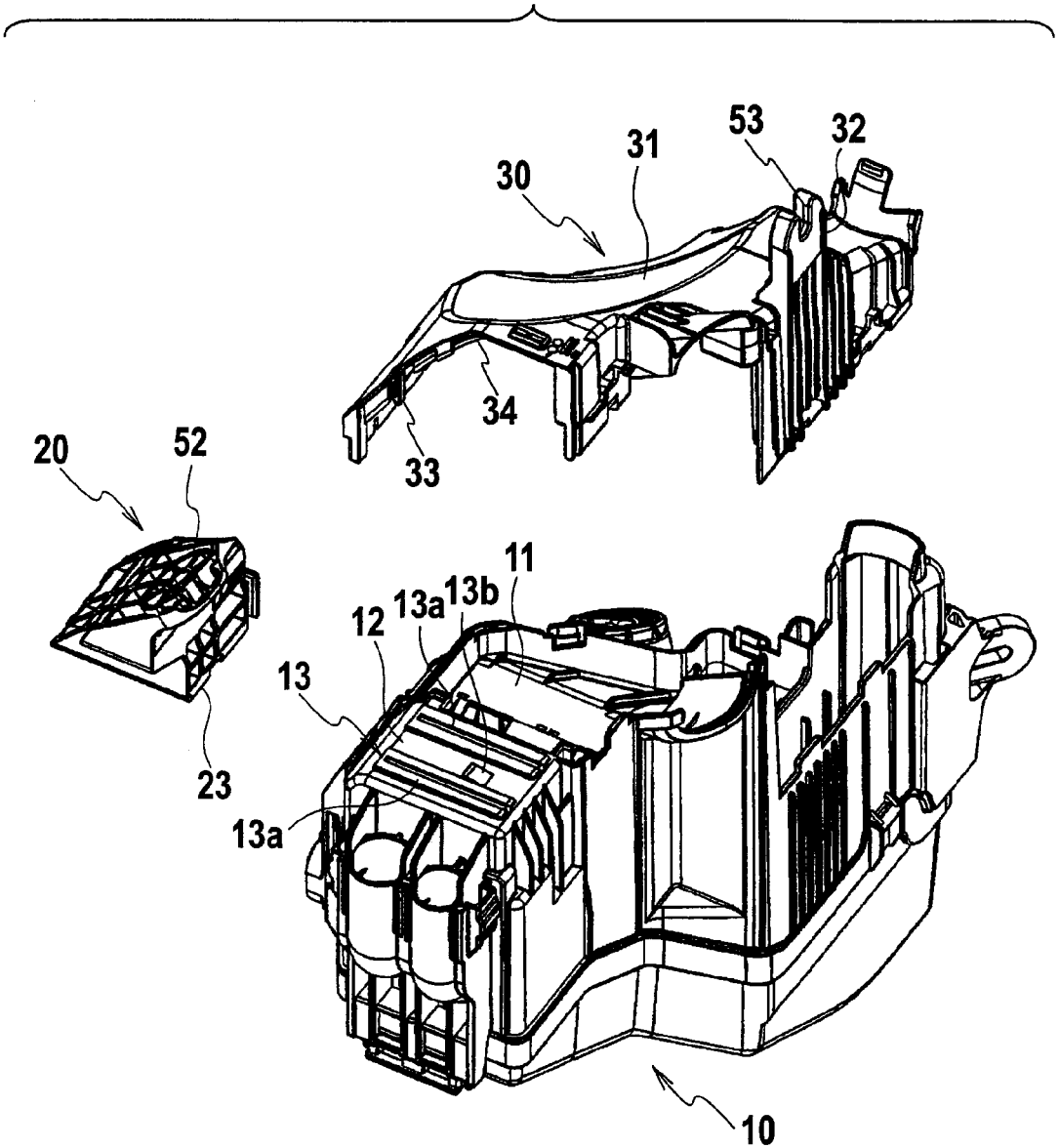
FIG. 5 is an exploded perspective view showing all exploded components of the electrical junction box reversed.

On an attachment surface (a top surface) of the attachment bracket 20 and the bracket seat 12 of the box body 10, sliding lock mechanisms 13 and 23 are provided, respectively. The sliding lock mechanisms 13 and 23 fix the attachment bracket 20 linearly sliding in a predetermined direction, to the bracket seat 12. As shown in FIG. 5, the sliding lock mechanism 13 of the bracket seat 12 includes slide rails 13a and a lock unit 13b. On the other hand, the sliding lock mechanism 23 (not shown)

of the attachment bracket 20 includes slide rails which fit to the slide rails 13a and a lock unit which is locked to the lock unit 13b.

In this case, as shown in FIG. 2, portions of the grooves 41 and 42 of the box body 10 and attachment bracket 20 which are arranged in a line are formed to extend in a direction B intersecting a direction A that the sliding lock mechanisms 13 and 23 slide.

In addition to the bolt fastening portion 52 provided for the attachment bracket 20, the box body 10 includes a bolt fastening portion 51, and the lower cover 30 includes an attachment bracket 32 including a bolt fastening portion 53. The electrical junction box is fixed to a vehicle body using these three bolt fastening portions 51 to 53.

In the case of assembling the electrical junction box having such a structure, first, the attachment bracket 20 is mounted on the bracket seat 12 in the bottom surface of the box body 10 through the sliding lock mechanisms 13 and 23. When the attachment bracket 20 is properly mounted, as shown in FIG. 2, the groove 42 of the attachment bracket 20 is smoothly continuous with the groove 41 of the box body 10 to form the single groove 40.

Next, the lower cover 30 is attached to the bottom of the box body 10. The protrusions 33 and 34 provided for the inner surface of the edge 31a of the lower cover 30 are fitted into the single continuous groove 40. The lower cover 30 is then locked to the box body 10, thus completing the electrical junction box.

When the attachment bracket 20 is not properly mounted, the groove 41 of the box body 10 is not continuous with the groove 42 of the attachment bracket 20. Accordingly, the protrusions 33 and 34 are not fitted into the grooves 41 and 42, and the lower cover 30 cannot be correctly attached. This makes it possible to find improper mounting of the attachment bracket 20.

In the case of the electrical junction box of this embodiment, the attachment bracket 20 is dismountable to the box body 10, and the attachment bracket 20 can be mounted and dismounted as needed. Moreover, it is possible to select and mount a necessary type of the attachment bracket 20.

Accordingly, even in the case where there are various attachment forms depending on vehicle types or the like, it is not necessary to prepare different types of electrical junction boxes for the individual various attachment forms. The box body 10 as a main part of the electrical junction box is shared as a common part, and it is only necessary to prepare different types of the attachment bracket 20 corresponding to the individual attachment forms. The production efficiency can be therefore increased.

Moreover, the protrusion 34 of the lower cover 30 which is attached secondly is fitted into the groove 42 of the attachment bracket 20 mounted on the box body 10. Accordingly, the attachment bracket 20 cannot be detached until the lower cover 30 is removed. Even if the attachment bracket 20 is small, the attachment bracket 20 can be therefore firmly fixed to the box body 10, thus the support strength to fix the electrical junction box to the vehicle body increases. The attachment bracket 20 is a key part which supports and fixes the electrical junction box to the vehicle body, and firmly fixing the attachment bracket 20, which is detachable, is very important in increasing the reliability of the electrical junction box.

When the attachment bracket 20 is not properly mounted, the groove 42 of the attachment bracket 20 and the groove 41 of the box body 10 do not form a single continuous groove, and the protrusions 33 and 34 of the lower cover 30 cannot be fitted into the grooves 41 and 42. This makes it possible to recognize the state where the attachment bracket 20 is improperly assembled.

Furthermore, the attachment bracket 20 is mounted on the box body through the sliding lock mechanisms 13 and 23, and the grooves 41 and 42 extend in the direction B, which intersects the direction A, in which the sliding lock mechanisms 13 and 23 slide. Accordingly, when the attachment bracket 20 is improperly mounted, the grooves 41 and 42 are discontinuous with a step interposed therebetween. This prevents the lower cover 30 from being properly attached to the box body 10, and the improper assembly of the attachment bracket 20 can be recognized more clearly.

What is claimed is:

1. An electrical junction box comprising:
   a box body provided with a first groove, accommodating an electrical part;
   an attachment bracket provided with a second groove, dismountably mounted to a bottom surface of the box body; and
   a lower cover provided with a protrusion, attached to the bottom surface of the box body;
   wherein, when the attachment bracket is properly mounted on the box body, the first and second grooves are arranged to form a single continuous third groove; and the protrusion fits to the third groove.

2. The electrical junction box according to claim 1, further comprising:
   a sliding lock mechanism through which the attachment bracket is mounted on the box body;
   wherein the first and second grooves extend in a direction intersecting a direction that the sliding lock mechanism slides.

* * * * *